(12) United States Patent
Takahashi et al.

(10) Patent No.: US 9,493,037 B2
(45) Date of Patent: Nov. 15, 2016

(54) PNEUMATIC TIRE

(75) Inventors: Fumio Takahashi, Kodaira (JP); Souto Nakayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1489 days.

(21) Appl. No.: 12/808,431

(22) PCT Filed: Dec. 17, 2008

(86) PCT No.: PCT/JP2008/072948
§ 371 (c)(1),
(2), (4) Date: Jul. 14, 2010

(87) PCT Pub. No.: WO2009/078425
PCT Pub. Date: Jun. 25, 2009

(65) Prior Publication Data
US 2011/0114238 A1    May 19, 2011

(30) Foreign Application Priority Data

Dec. 17, 2007   (JP) ................. 2007-325279

(51) Int. Cl.
*B60C 3/00* (2006.01)
*B60C 3/04* (2006.01)
*B60C 9/02* (2006.01)
*B60C 9/18* (2006.01)
*B60C 9/28* (2006.01)
(Continued)

(52) U.S. Cl.
CPC ............. *B60C 3/04* (2013.01); *B60C 9/2009* (2013.04); *B60C 9/28* (2013.01); *B60C 11/0083* (2013.04)

(58) Field of Classification Search
CPC ............. B60C 3/00; B60C 3/04; B60C 9/02; B60C 9/18; B60C 9/28
See application file for complete search history.

(56) References Cited

U.S. PATENT DOCUMENTS

| 4,662,416 A | * | 5/1987 | Yagi et al. ............... 152/209.14 |
| 4,884,610 A | | 12/1989 | Saito |
| 5,027,877 A | * | 7/1991 | Tamura et al. ............ 152/527 |

(Continued)

FOREIGN PATENT DOCUMENTS

| EP | 0 298 673 A2 | 1/1989 |
| EP | 0 554 108 A1 | 8/1993 |

(Continued)

OTHER PUBLICATIONS

Machine translation of JP 6-1109, 1994.*

(Continued)

*Primary Examiner* — Justin Fischer
(74) *Attorney, Agent, or Firm* — Sughrue Mion, PLLC

(57) ABSTRACT

The present invention provides a pneumatic tire having a carcass as a skeleton extending in a toroidal shape over a pair of bead portions, a belt including at least one slant layer, and a tread, the belt and the tread being disposed on the outer side in the tire radial direction of a crown portion of the carcass in this order, characterized in that: a ratio BD/BW of radius difference BD between radius at the center portion and radius at an end portion in the tire widthwise direction of the outermost layer of the slant belt layer(s), to a width BW of the outermost layer, is in the range of 0.01 to 0.04 in a section of the tire in the widthwise direction in a state where the tire is assembled with an application rim. A pneumatic tire being excellent in wear resistance performance and having relatively low rolling resistance can be obtained accordingly.

10 Claims, 9 Drawing Sheets

(51) Int. Cl.
    *B60C 9/20*     (2006.01)
    *B60C 11/00*     (2006.01)

(56) References Cited

U.S. PATENT DOCUMENTS

| | | |
|---|---|---|
| 5,196,076 A | 3/1993 | Ochiai |
| 5,373,884 A | 12/1994 | Kamegawa et al. |
| 6,213,182 B1 | 4/2001 | Hanya et al. |
| 6,443,201 B1 | 9/2002 | Colantonio et al. |
| 6,457,503 B1 | 10/2002 | Aoki |
| 2009/0101265 A1 | 4/2009 | Abe |

FOREIGN PATENT DOCUMENTS

| | | | |
|---|---|---|---|
| EP | 1167081 | * | 1/2002 |
| JP | S62265002 A | | 11/1987 |
| JP | 63-269702 A | | 11/1988 |
| JP | 3-10904 A | | 1/1991 |
| JP | 4-218413 A | | 8/1992 |
| JP | 4274902 A | | 9/1992 |
| JP | 5-201202 A | | 8/1993 |
| JP | 5-246208 A | | 9/1993 |
| JP | 5-254315 A | | 10/1993 |
| JP | 6-1109 A | | 1/1994 |
| JP | 9-226316 A | | 9/1997 |
| JP | 11-028908 A | | 2/1999 |
| JP | 2000-190706 A | | 7/2000 |
| JP | 2000-289409 A | | 10/2000 |
| JP | 2002-178720 A | | 6/2002 |
| JP | 2004-098838 A | | 4/2004 |
| JP | 2005145446 A | | 6/2005 |
| JP | 2005350023 A | | 12/2005 |
| JP | 2006-327502 A | | 7/2006 |
| JP | 2006-341633 A | | 12/2006 |
| WO | 0242094 A1 | | 5/2002 |
| WO | 2006/129721 A1 | | 12/2006 |
| WO | 2008/099899 A1 | | 8/2008 |

OTHER PUBLICATIONS

Extended European Search Report issued in European Application No. 11188678.4 dated Dec. 14, 2011 (4 pages).
Extended European Search Report issued in European Application No. 08861779.0-2425 / 2233320 dated Apr. 12, 2011 (4 pages).
Japanese Office Action dated Jan. 29, 2013 issued in corresponding Japanese Patent Application No. 2009-546275.
Chinese Office Action dated Feb. 22, 2013 issued in corresponding Chinese Application No. 200880124854.3.
Japanese Office Action dated Nov. 13, 2012 issued in corresponding Japanese Patent Application No. 2008-130986.
Chinese Office Action and Search Report issued in Chinese Application No. 200880124854.3 dated Jul. 24, 2012.
1360-IT, 2008-2 European Tire Analysis Report, Jun. 30, 2008, Smithers Scientific Service, Inc., Akron, Ohio, USA (online publication).
7024-T, March 1980 Tire Analysis Report, Mar. 21, 1980, Smithers Scientific Service, Inc., Akron, Ohio, USA.
7027-T, March 1980 Tire Analysis Report, Mar. 21, 1980, Smithers Scientific Service, Inc., Akron, Ohio, USA.
Chinese Office Action dated Nov. 15, 2014 issued in corresponding Chinese Patent Application No. 200880124854.3.
Japanese Office Action dated Dec. 16, 2014 issued in corresponding Japanese Patent Application No. 2009-546275.
Japanese Office Action dated Nov. 12, 2013 issued in corresponding Japanese Application No. 2009-546275.
Japanese Office Action dated Aug. 13, 2013 issued in corresponding Japanese Application No. 2008-130986.
Chinese Office Action dated May 27, 2014 issued in corresponding Chinese Patent Application No. 200880124854.3.

* cited by examiner

PNEUMATIC TIRE

TECHNICAL FIELD

The present invention relates to a pneumatic tire being excellent in wear resistance performance and having relatively low rolling resistance.

PRIOR ART

In recent years, there has been actively pursued development of products having relatively little undesirable impact on the environment. This trend is due to the environmental problems including global warming and tire is not an exception in development of such environmentally friendly products. Regarding tires, it is important to ensure performances thereof contributing to reducing fuel consumption of an automobile in order to address these environmental problems. Reducing rolling resistance of a tire has been proposed as one way of achieving such a task and various technologies have been developed in this regard. Some of the conventional methods of decreasing rolling resistance are as follows.

First, it is known that a relatively large proportion of rolling resistance of a tire is generated in rubber of a tread portion. As a method of directly addressing this problem, it is effective to replace rubber for use in the tread portion with rubber having relatively small loss tangent. However, it is also known that other performances of the tire, e.g. wear resistance performance, are sacrifice in this method. Secondly, one can easily conceive a method of decreasing thickness of the tread portion to reduce rubber as a source of generating and increasing rolling resistance. However, in this case there arises a problem that a sufficiently long wear-resisting period cannot be ensured in the product life of the tire.

Yet further, there has been proposed decreasing rolling resistance by modifying a sectional shape of a tire in JP 2006-327502. Although rolling resistance can indeed be reduced by this proposal, more specified tire designing is still needed in view of making rolling resistance compatible with other performances, in particular, excellent wear resistance.

DISCLOSURE OF THE INVENTION

Problems to be Solved by the Invention

In view of the problems described above, an object of the present invention is to propose detailed tire configurations for providing a tire being excellent in wear resistance performance and having relatively low rolling resistance.

Means for Solving the Problems

The inventors of the present invention have discovered that performances of a tire can be improved as desired by meticulously regulating the tire shape and that, in a case of shape designing, in particular, it is effective to individually regulate respective shapes of reinforcing structures as a skeleton of the tire, as well as the shape of the outer surface of the tire, because the shapes of reinforcing structures have significant influences on tire performances. Specifically, the inventors of the present invention have discovered that suppressing shear deformation of a tire in a section in the tire widthwise direction, in particular, shear deformation in a tread on the outer side in the widthwise direction thereof results in simultaneous improvement of decrease in rolling resistance generated as a result of energy loss caused by this deformation and reduction of wear often generated by shearing force and slip also caused by the deformation, thereby completing the present invention.

The subject-matters of a structure of the present invention is as follows.

(1) A pneumatic tire having a carcass as a skeleton extending in a toroidal shape over a pair of bead portions, a belt including at least one slant layer, and a tread, the belt and the tread being disposed on the outer side in the tire radial direction of a crown portion of the carcass in this order, characterized in that: a ratio BD/BW of radius difference BD between radius at the center portion and radius at an end portion in the tire widthwise direction of the outermost layer of the slant belt layer(s), to a width BW of the outermost layer, is in the range of 0.01 to 0.04 in a section of the tire in the widthwise direction in a state where the tire is assembled with an application rim.

In the present invention, a "state where a tire is assembled with an application rim" represents a state where a tire is assembled with a standard rim or an application rim of another type prescribed in Japan Automobile Tyre Manufacturers Association (JATMA) and the tire is inflated at no internal pressure or an extremely low internal pressure up to 30 kPa or so.

(2) The pneumatic tire of (1) above, wherein a ratio CSWh/CSH of the shortest distance CSWh between a line drawn in parallel with the rotation axis of the tire at the maximum width position of the carcass and a line drawn in parallel with the rotation axis of the tire at a bead toe, to a distance CSH in the radial direction between the outermost side of the carcass and the bead toe, is in the range of 0.6 to 0.9.

(3) The pneumatic tire of (1) or (2) above, wherein a ratio SWh/SH of the shortest distance SWh between a line drawn in parallel with the rotation axis of the tire at the maximum width position of the tire and a line drawn in parallel with the rotation axis of the tire at a bead toe, to a sectional height SH of the tire, is in the range of 0.5 to 0.8.

(4) The pneumatic tire of any of (1) to (3) above, wherein a ratio BW/CSW of the width BM of the outermost layer of the slant layer(s), to the maximum width CSW of the carcass, is in the range of 0.8 to 0.94.

(5) The pneumatic tire of any of (1) to (4) above, wherein a ratio TD/(BW/2) of radius difference TD between radius at the center portion and radius at an end portion in the widthwise direction of the tread, to a half width BW/2 of the outermost layer of the slant belt layer(s), is in the range of 0.06 to 0.11.

(6) The pneumatic tire of any of (1) to (5) above, wherein a ratio CSL/CSP of a path length CSL from a position corresponding to the end portion in the widthwise direction of the outermost layer of the slant belt layer(s) to a position corresponding to the maximum width of the carcass, to a path length CSP from a position corresponding to the center portion in the widthwise direction of the outermost layer of the slant layer(s) to a position right below the bead core, is n the range of 0.1 to 0.25.

(7) The pneumatic tire of any of (1) to (6) above, wherein height at a position along the maximum width CSW of the carcass, distanced from one end of CSW by a length 0.8 times as long as CSW, is in the range of 0.90 to 0.97 times as much as the sectional height SH of the tire.

(8) The pneumatic tire of any of (1) to (7) above, wherein a belt projection angle at an end portion in the widthwise direction of the outermost layer of the slant belt layer(s) is in the range of 0° to 10°.

In the present invention, a "belt projection angle" represents an angle determined by: finding an intermediate direction (an intermediate line) between the tangent direction at one end portion of the outermost layer of the slant belt layer(s) and the tangent direction at a position of the innermost layer of the slant belt layer(s) corresponding to the one end portion of the outermost layer in a section in the tire widthwise direction; and measuring an angle between the tire widthwise direction which is regarded as 0° and the intermediate line.

(9) The pneumatic tire of any of (1) to (8) above, wherein the carcass has a turn-up portion turned up at each bead core from the inner side toward the outer side in the tire widthwise direction to extend toward the outer side in the radial direction, and the shortest distance CSEh between the terminal end of the turn-up portion and a line drawn in parallel with the rotation axis of the tire at the bead toe is not larger than 0.5 times as much as the shortest distance SWh between a line drawn in parallel with the rotation axis of the tire at the maximum width position of the tire and a line drawn in parallel with the rotation axis of the tire at the bead toe.

Effect of the Invention

According to the present invention, there can be provided a tire being excellent in wear resistance performance and having relatively low rolling resistance.

EXPLANATION OF NUMERAL REFERENCES 1 bead core
2 Carcass
2a Turn-up portion
3a Slant belt layer (the outermost layer)
3b Slant belt layer
4 Circumferential belt layer
5 Tread

BEST MODE FOR IMPLEMENTING THE INVENTION

The present invention will be described in details hereinafter with reference to the drawings.

Figure 1:
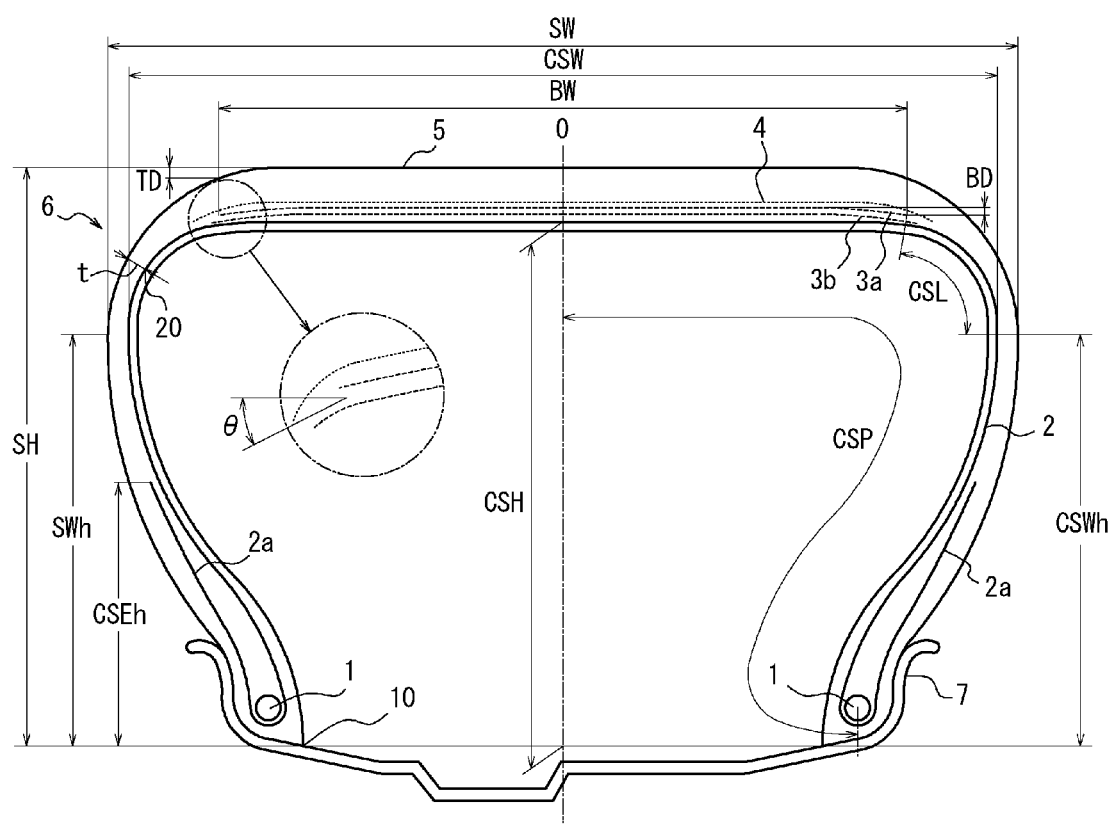
FIG. 1 is a view showing a section in the widthwise direction of a tire according to the present invention.

A section of a tire according to the present invention, in the widthwise direction thereof, is shown in FIG. 1. In FIG. 1, reference number 1 represents a pair of bead cores; a carcass 2 as a skeleton, having at least one ply of radially arranged cords, extends in a toroidal shape between the bead cores 1; at least one layer of slant belt layer (a slant belt layer 3a and a slant belt layer 3b in an example of FIG. 1), formed by coating a number of cords extending in a direction inclined with respect to the equatorial plane O of the tire with rubber, is disposed on the outer side in the radial direction of a crown portion of the carcass 2; at least one layer of circumferential belt layer (one circumferential belt layer 4 in an example of FIG. 1), formed by coating a number of cords extending along the equatorial plane O of the tire with rubber, is disposed on the outer side in the radial direction of the slant belt layer 3a; and a tread 5 is disposed on the outer side in the radial direction of the belt layer 4. The slant belt layer may be single-layered. However, in this case, it is preferable to combine the single slant belt layer with at least one layer of circumferential belt layer to constitute a belt.

Such a tire 6 structured as described above is assembled with an application rim 7 and served for use. In the present embodiment, it is essential that a ratio BD/BW of radius difference BD between radius at the center portion (the equatorial plane O) and radius at an end portion in the tire widthwise direction of the outermost layer 3a of the slant belt layers, to a width BW of the outermost layer, is in the range of 0.01 to 0.04 in a section in the widthwise direction of the tire 6 assembled with the application rim 7, as shown in FIG. 1.

In the present embodiment, the slant belt layer has a width which is equal to or larger than 0.6 times as much as the maximum width CSW of the carcass.

Figure 2:
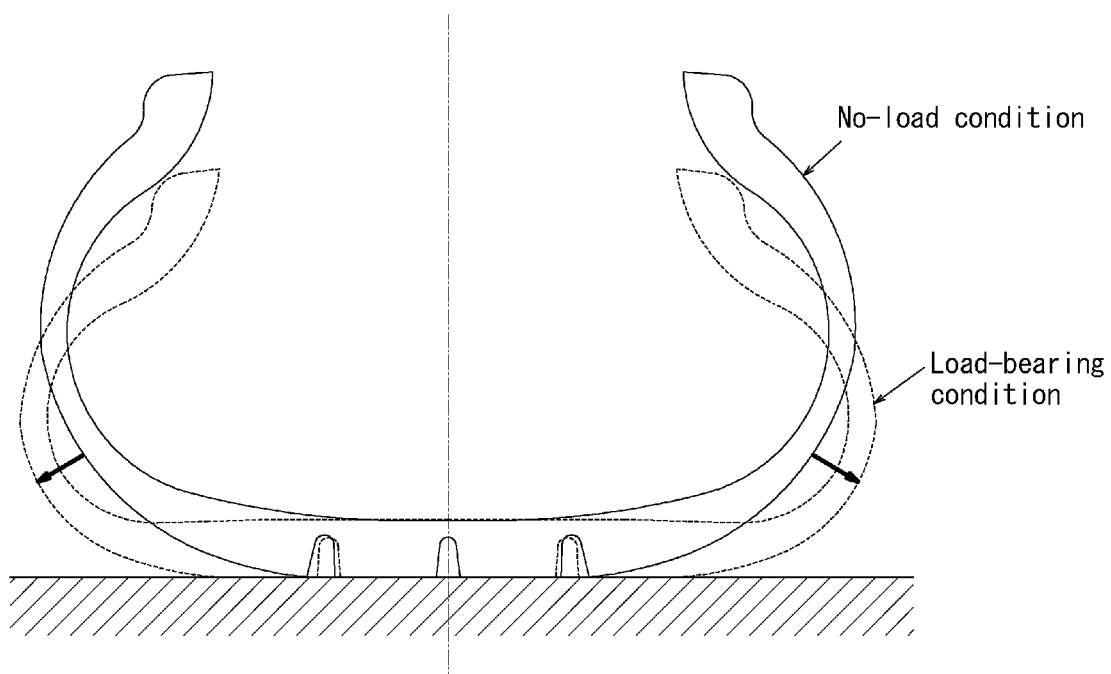
FIG. 2 is a view showing behaviors before and after application of load to a conventional tire.

The aforementioned ratio restriction means that there exists relatively small difference in radius, in the widthwise direction, of the slant belt layer 3. In other words, this restriction indicates that the belt is close to a state where it is flat. As described above, rolling resistance is primarily due to energy loss occurring in rubber of a tire tread portion and therefore suppressing shear deformation in a section in the widthwise direction, which shear deformation is one example of relevant deformation, is effective for decreasing rolling resistance. Such shear deformation as described above occurs mostly due to significant deformation between before and after application of load, which deformation is indicated in FIG. 2 by arrows, with solid lines representing a no-load state of a radial tire of size 195/65R15 (BD/BW ratio: 0.052) prior to the tire being inflated by an internal pressure and dotted lines representing a state where load of 4.41 kN is applied after the tire is inflated at an internal pressure of 210 kPa. Note that the shear deformation is deformation in which a curved belt is stretched flat at the ground contact portion thereof. Further, as shown in FIG. 2, a standard radial tire has a smaller radius at a shoulder portion thereof than the tire center portion, resulting in radius difference between the two portions, whereby the belt in the vicinity of the shoulder is stretched along the tire circumferential direction. As a result, the slant belt layer formed by cords intersecting each other is deformed like a pantograph to extend in the circumferential direction and shrink in the widthwise direction, thereby facilitating the aforementioned shear deformation and increasing hysteresis loss of tread rubber.

Figure 3:
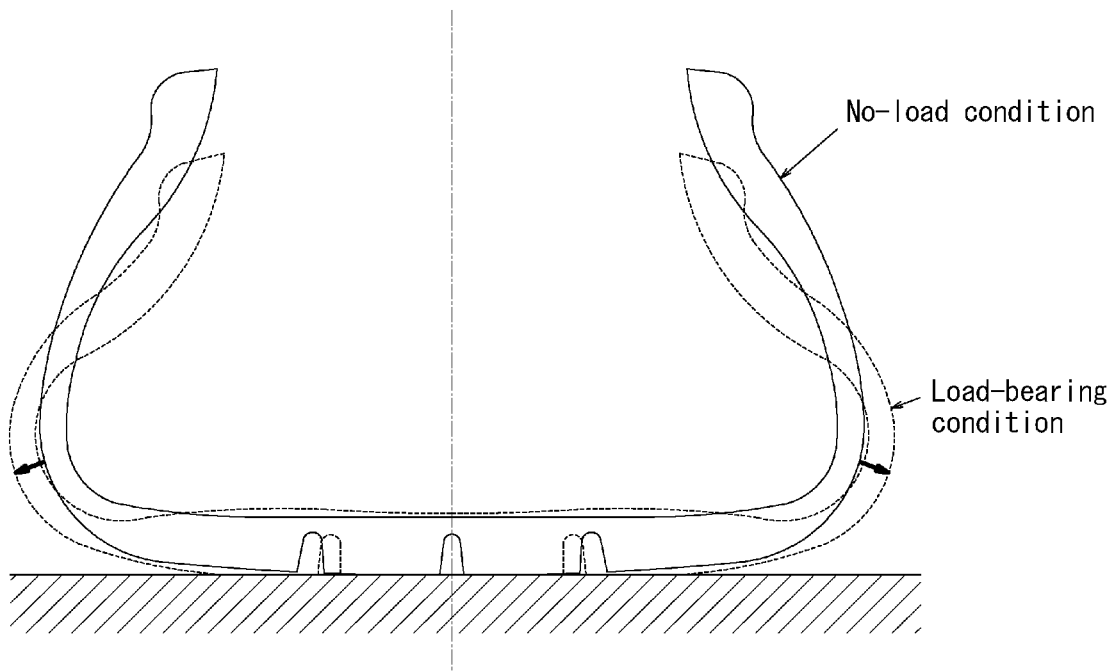
FIG. 3 is a view showing behaviors before and after application of load to a tire of the present invention.

In order to suppress this shear deformation in a configuration surface of a tire in the easiest and simplest manner, it is necessary to design a belt as flat as possible. Specifically, by making a belt of a tire having the same size as the tire of FIG. 2 significantly flat (BD/BW ratio: 0.026) and setting deformation of the tire between before and after application of load under the same condition as those in FIG. 2 such that BD/BW is no larger than 0.04 as shown in FIG. 3, deformation between before and after application of load (see arrows in FIG. 3) can be suppressed at a very low level. Accordingly, hysteresis loss of tread rubber is decreased and a tire having relatively low rolling resistance can be obtained by setting the ratio BD/BW thereof not to be larger than 0.04.

Further, it has been revealed that, in a case where the aforementioned modification of suppressing shear deformation is carried out, shearing force and distribution of tread slip within a ground contact surface change such that magnitudes thereof is reduced in terms of the tread configuration, whereby wear resistance performance of the tire can be improved, as well.

In actual designing of a tire, it is important that the tire is not made completely flat but curvedness thereof is set within an appropriate range in view of a deformation component associated with deformation of a side portion, also in view of a ground contact configuration and the distribution of ground contact pressure required for preventing partial wear from occurring. As a result of keen study of the appropriate range of the aforementioned curvedness, it has been revealed that the ratio BD/BW is required to be 0.01 or larger.

Hereinafter, the experiment results which revealed the aforementioned discovery will be described in details. Specifically, tests for rolling resistance and wear resistance were conducted, respectively, by using radial tires having the size 195/65 R15 under a condition in which the aforementioned BD/BW was varied at various values. These test tires share the same basic structure including one carcass ply, two slant belt layers and a circumferential reinforcing layer made of nylon disposed on the slant belt layers, in which basic structure cords of one slant belt layer which are inclined with respect to the tire equatorial plane by 24° intersect cords of the other slant layer which are inclined with respect to the tire equatorial plane by 24° to be symmetrical with the cords of the one slant belt layer with respect to the tire equatorial plane.

Figure 4:
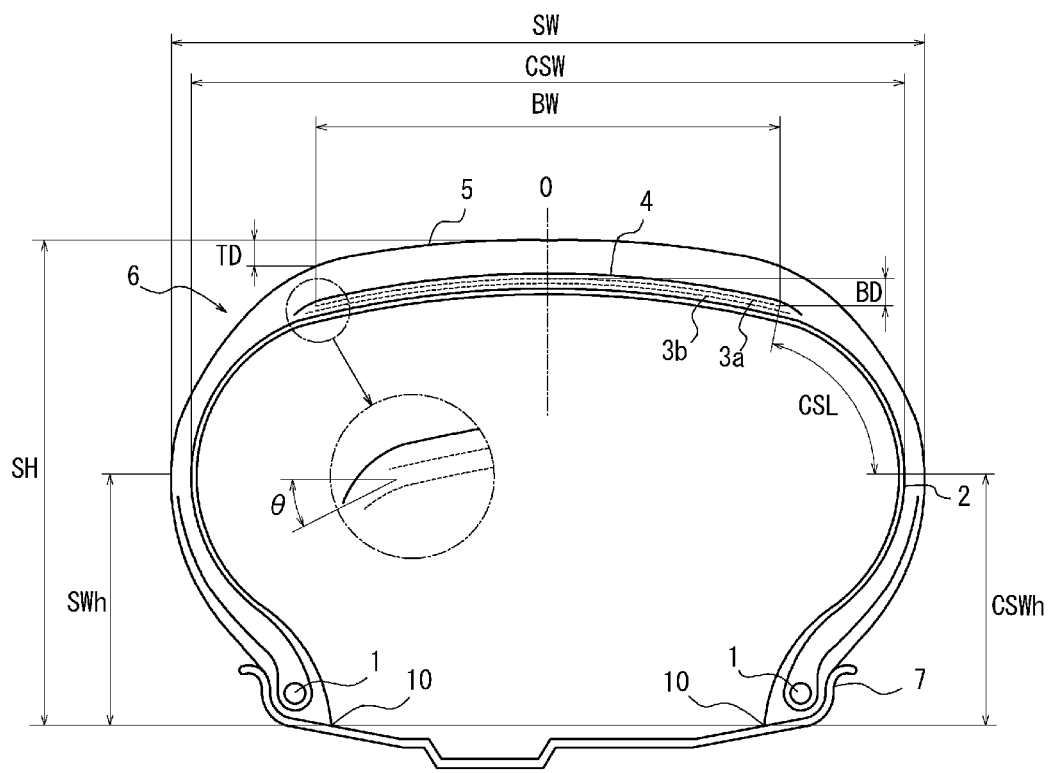
FIG. 4 is a view showing a section in the widthwise direction of the conventional tire.

In the present embodiment, the test for rolling resistance is conducted by: assembling a test tire with a standard rim; adjusting the internal pressure of the tire at 210 kPa; and obtaining rolling resistance of a shaft by using a drum tester having an iron surface of 1.7 diameter (speed: 80 km/h). The measurement result was expressed by a relative index value, with the rolling resistance of a conventional tire (0.04<BD/BW≥0.07), of which section in the widthwise direction is exemplarily shown in FIG. 4, being 100. The smaller index value represents the smaller rolling resistance. Regarding evaluation, a case where 5% or more difference is observed in terms of market advantage after eliminating errors is regarded a significant difference. A case where 10% or more difference is observed in rolling resistance, in particular, is regarded to have a superior effect.

The test for wear resistance was carried out by testing a test tire assembled with a rim, similar to those used in the test for rolling resistance, by an indoor drum tester with diameter of 1.7 m (having a safety walk on a surface thereof) at the speed of 80 km/h. Regarding input, 10-minute free rolling and 10-minute rolling with braking force of 0.1 G being applied thereto were repeated alternately. The weight of wear (the amount of rubber which had been worn) after running 1200 km under the aforementioned condition was evaluated by an index value relative to Conventional Example. The smaller weight of wear is the better. A case where less than 5% difference is observed is regarded to be equivalent to Conventional Example, and a case where 10% or more difference is observed is regarded to be significantly different from Conventional Example. This is rather a test for evaluating degree of wear resistance because a weight of wear is compared according to the method thereof. However, since a tire having poor resistance to partial wear exhibits wear at a relatively early stage anyway, partial wear can be detected by the aforementioned test for wear resistance. Accordingly, the aforementioned test for wear resistance enables evaluation of resistance to partial wear, as well as evaluation of resistance to wear in general.

Figure 5:
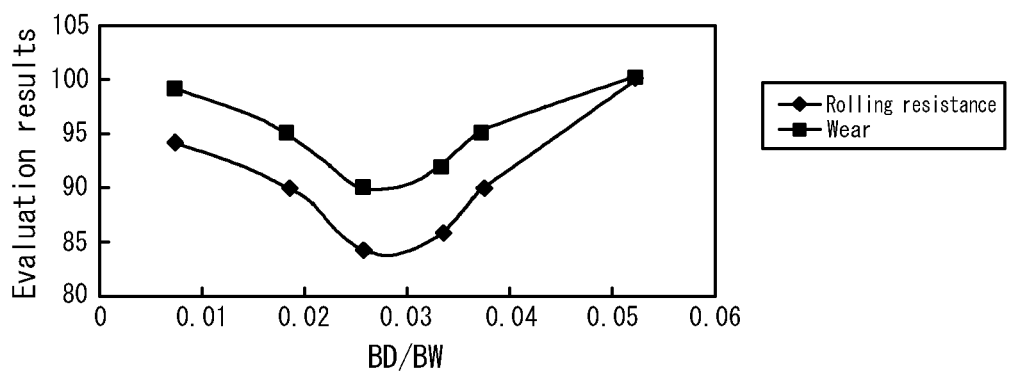
FIG. 5 is a view showing how a ratio BD/BW influences rolling resistance and wear resistance.

From the experiment results described above, a significant difference, as compared with the conventional tire, has been confirmed in each of rolling resistance and wear resistance when the ratio BD/BW is in the range of 0.01 to 0.04, and more preferably in the range of 0.02 to 0.035, as shown in FIG. 5.

Next, as shown in FIG. 1, a ratio CSWh/CSH of the shortest distance CSWh between a line drawn in parallel with the rotation axis of the tire at the maximum width position of the carcass and a line drawn in parallel with the rotation axis of the tire at a bead toe, to a distance CSH in the radial direction between the outermost side of the carcass and the bead toe, is in the range of 0.6 to 0.9, and more preferably in the range of 0.7 to 0.8.

According to this restriction, a carcass line of a tire side portion in the vicinity of a road surface has a locally bent region and bending rigidity is relatively small in this region. As a result, portions around the bent region, located on the outer side in the widthwise direction than the belt width, deforms significantly when load is applied thereon, whereby a magnitude of deformation in a tread portion decreases. In other words, a magnitude of shear deformation in a widthwise section can be decreased in the tread portion. After testing various dimensions to effectively reduce deformation when load is applied on a tire, it has been revealed that the ratio CSWh/CSH is required to be in the range of 0.6 to 0.9.

Hereinafter, the experiment results which revealed the aforementioned discovery will be described in details. Specifically, tests for rolling resistance and wear resistance were conducted, respectively, by using radial tires having the size 195/65 R15 under a condition in which the aforementioned ratio CSWh/CSH was varied at various values. The ratio BD/BW was maintained at 0.026. Other tire structuring conditions and evaluation methods are the same as those in the experiments of the ratio BD/BW.

Figure 6:
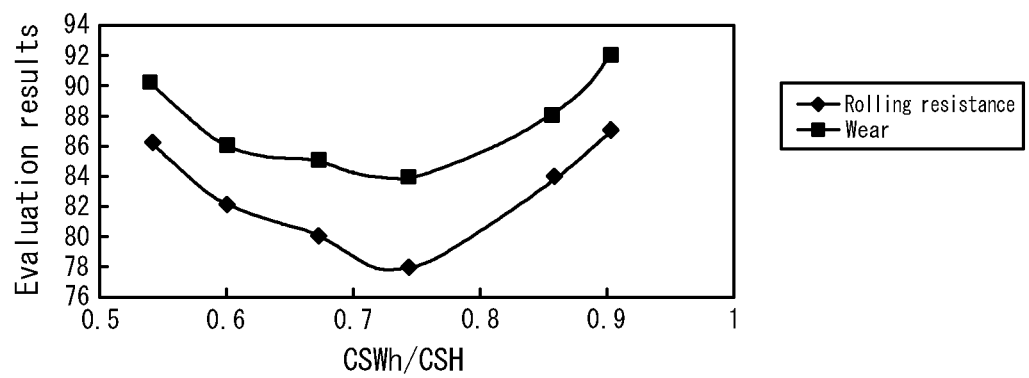
FIG. 6 is a view showing how a ratio CSWh/CSH influences rolling resistance and wear resistance.

From the experiment results described above, a significant difference, as compared with the conventional tire, has been confirmed in each of rolling resistance and wear resistance when the ratio CSWh/CSH is in the range of 0.6 to 0.9, as shown in FIG. 6.

Further, a ratio SWh/SH of the shortest distance SWh between a line drawn in parallel with the rotation axis of the tire at the maximum width position of the tire and a line drawn in parallel with the rotation axis of the tire at a bead toe, to a sectional height SH of the tire, is preferably in the range of 0.5 to 0.8, and more preferably in the range of 0.6 to 0.75, as shown in FIG. 1.

Regarding a shape of a side portion, it is primarily important to regulate the shape by a carcass line as a skeleton. However, the side portion cannot be excluded from consideration of the phenomenon that energy loss occurring inside rubber contributes to rolling resistance. That is, modifying a side portion such that the side portion conforms to a carcass line to have a different shape from that of a conventional tire would result in efficient improvement of a tire. This means, for example, making side rubber relatively thin. If side rubber were to be completely eliminated, the dimension of a side portion would obviously coincide with the maximum width position of the carcass line. In actual practice, however, side rubber must have a predetermined thickness in order to protect the carcass upon contact with curbstones and for other purposes. In view of the situation described above, a height of the side portion at the tire maximum width position relative to the sectional height of the tire was adjusted, whereby it was confirmed that a ratio SWh/SH should be within the aforementioned range. Since designing of a vulcanization mold is critically important in tire designing, it is necessary in terms of a tire designing method to define the modifications in the present invention as dimensions of the outer surfaces of a tire.

Hereinafter, the experiment results which revealed the aforementioned discovery will be described in details. Specifically, tests for rolling resistance and wear resistance were conducted, respectively, by using radial tires having the size 195/65 R15 under a condition in which the aforementioned ratio SWh/SH was varied at various values. The ratio BD/BW was maintained at 0.026 and the ratio CSWh/CSH was maintained at 0.746. Other tire structuring conditions and evaluation methods are the same as those in the experiments of the ratio BD/BW.

Figure 7:
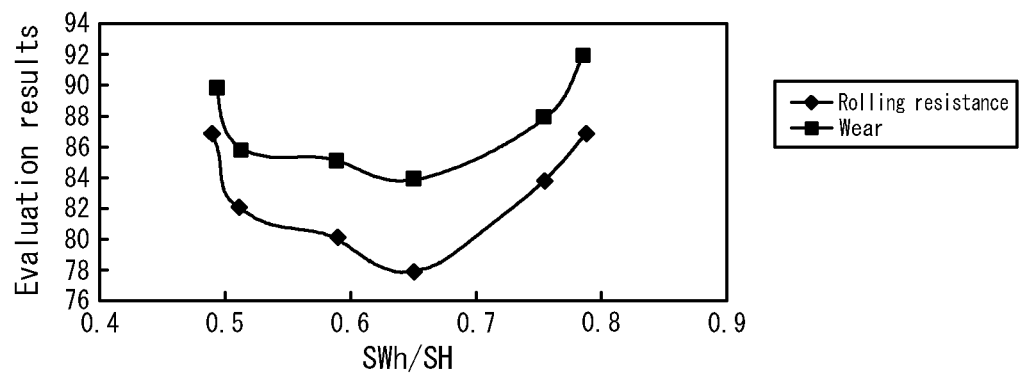
FIG. 7 is a view showing how a ratio SWh/SH influences rolling resistance and wear resistance.

From the experiment results described above, a significant difference, as compared with the conventional tire, has been confirmed in each of rolling resistance and wear resistance when the ratio SWh/SH is in the range of 0.5 to 0.8, as shown in FIG. 7.

Further, a ratio BW/CSW of the width BM of the outermost layer 3*a* of the slant layers, to the maximum width CSW of the carcass, is preferably in the range of 0.8 to 0.94, and more preferably in the range of 0.84 to 0.93, as shown in FIG. 1. In the present invention, the crown portion of the tire has a relatively flat configuration. Therefore, a ground contact shape of the tire naturally tends to expand in the widthwise direction, whereby a structure of the reinforcing layer in accordance with such an expansion is required. In particular, in order to prevent partial wear from occurring, a ground contact width is preferably not larger than a width along which plural reinforcing layers exist. In view of these facts, it has been confirmed that a belt width in the case where a tire configuration of the present invention is employed needs to be set wider than usual and the belt width should preferably comply with the restriction described above. On the other hand, as described in relation to shear deformation in a widthwise section of a tire, existence of an excess belt portion beyond a ground contact surface results in deterioration of rolling resistance. Therefore, the lower limit for the restriction to suppress partial wear and the upper limit for the restriction to suppress rolling resistance are both important in the aforementioned ratio restriction.

Hereinafter, the experiment results which revealed the aforementioned discovery will be described in details. Specifically, tests for rolling resistance and wear resistance were conducted, respectively, by using radial tires having the size 195/65 R15 under a condition in which the aforementioned ratio BW/CSW was varied at various values. The ratio BD/BW, the ratio CSWh/CSH and the ratio SWh/SH were maintained at 0.026, 0.746 and 0.654, respectively. Other tire structuring conditions and evaluation methods are the same as those in the experiments of the ratio BD/BW.

Figure 8:
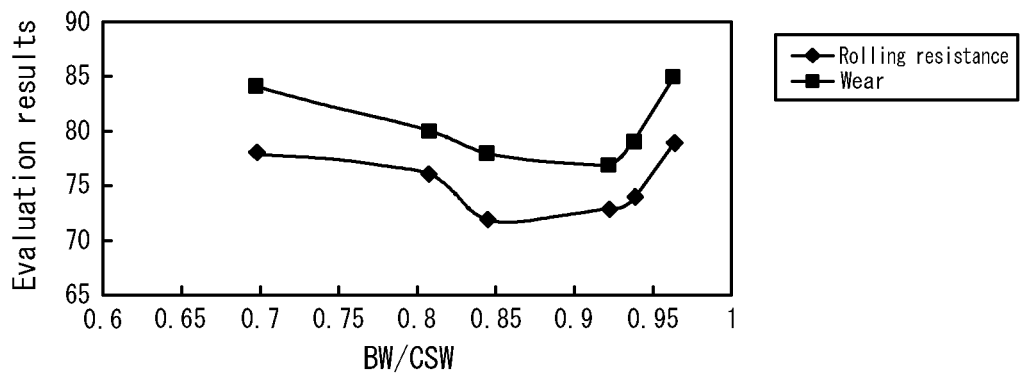
FIG. 8 is a view showing how a ratio BW/CSW influences rolling resistance and wear resistance.

From the experiment results described above, a significant difference, as compared with the conventional tire, has been confirmed in each of rolling resistance and wear resistance when the ratio BW/CSW is in the range of 0.8 to 0.94, as shown in FIG. 8.

A ratio TD/(BW/2) of radius difference TD between radius at the center portion (the tire equatorial plane O) and radius at an end portion in the widthwise direction of the tread 5, to a half width BW/2 of the outermost layer 3*a* of the slant belt layers, is preferably in the range of 0.06 to 0.11 and more preferably in the range of 0.075 to 0.095, as shown in FIG. 1.

This is a restriction of tread surface position right above the slant belt layers. It is preferable that not only a belt is made relatively flat to suppress shear deformation as described above but also the tread outer surface is also set at an appropriate position. If rubber has thickness distribution allowing a tread surface to retain a crown-like shape (see FIG. 2), partial wear due to radius difference upon contact with the ground occurs and a wear-resisting period is shortened because a portion where rubber is relatively thin tends to be completely worn. Accordingly, it is preferable to clearly define the ratio TD/(BW/2) as a degree of tread curvedness in a predetermined range, as is the case with the belt.

Hereinafter, the experiment results which revealed the aforementioned discovery will be described in details. Specifically, tests for rolling resistance and wear resistance were conducted, respectively, by using radial tires having the size 195/65 R15 under a condition in which the aforementioned ratio TD/(BW/2) was varied at various values. The ratio BD/BW, the ratio CSWh/CSH, the ratio SWh/SH, and the ratio BW/CSW were maintained at 0.026, 0.746, 0.654 and 0.844, respectively. Other tire structuring conditions and evaluation methods are the same as those in the experiments of the ratio BD/BW.

Figure 9:
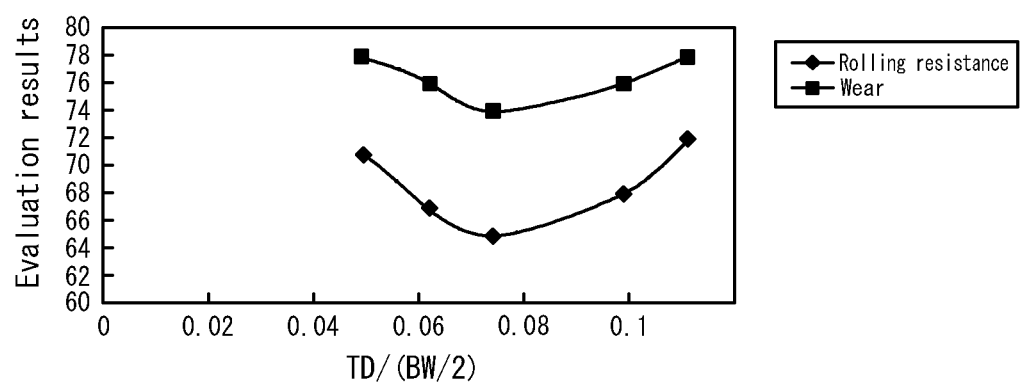
FIG. 9 is a view showing how a ratio TD/(BW/2) influences rolling resistance and wear resistance.

From the experiment results described above, a significant difference, as compared with the conventional tire, has been confirmed in each of rolling resistance and wear resistance when the ratio TD/(BW/2) is in the range of 0.06 to 0.11, as shown in FIG. 9.

The carcass line in a region between the maximum width position of the carcass and an end portion in the widthwise direction of the outermost layer 3*a* of the slant belt layers preferably has the smallest curvature radius in the range of 5 mm to 25 mm. That is, more directly speaking, it is preferable to approximate a configuration between the maximum width position of the carcass and the position under the belt end to an arc of a circle and regulate a curvature of radius of the arc. Designing of a mold is very important in tire designing as described above and specifying a radius of curvature of the aforementioned curved region has a significant meaning in terms of a tire designing method.

A ratio CSL/CSP of a path length CSL from a position corresponding to the end portion in the widthwise direction of the outermost layer 3*a* of the slant belt layers to a position corresponding to the maximum width of the carcass, to a path length CSP from a position corresponding to the center portion (the tire equatorial plane O) in the widthwise direction of the outermost layer 3a of the slant layers to a position right below the bead core 1, in the carcass 2 is preferably in the range of 0.1 to 0.25 and more preferably in the range of 0.12 to 0.18, as shown in FIG. 1. The path length CSP from the position corresponding to the equatorial plane O to the position right below the bead core 1 is a substantial path length of the carcass. In a case of an interposed type bead core, the path does not include a winding portion around a core and the path length is a length of the interposed portion.

This restriction regulates the length of a carcass portion where the carcass is locally bent as described above. Specifically, a desired localized deformation can be made to occur by optimizing, in designing a smooth curve linking a position corresponding to the maximum width of the carcass line and the position below the belt end, a length of the carcass in a region corresponding to the curve. A relatively short carcass length of the region means that the carcass direction changes from the radial direction to substantially the widthwise direction in such a short distance as that length, thereby reinforcing configurational characteristics that the carcass is locally bent.

Hereinafter, the experiment results which revealed the aforementioned discovery will be described in details. Specifically, tests for rolling resistance and wear resistance were conducted, respectively, by using radial tires having the size 195/65 R15 under a condition in which the aforementioned ratio CSL/CSP was varied at various values. The ratio BD/BW, the ratio CSWh/CSH, the ratio SWh/SH, the ratio BW/CSW, and the ratio TD/(BW/2) were maintained at 0.026, 0.746, 0.654, 0.844, and 0.134, respectively. Other tire structuring conditions and evaluation methods are the same as those in the experiments of the ratio BD/BW.

Figure 10:
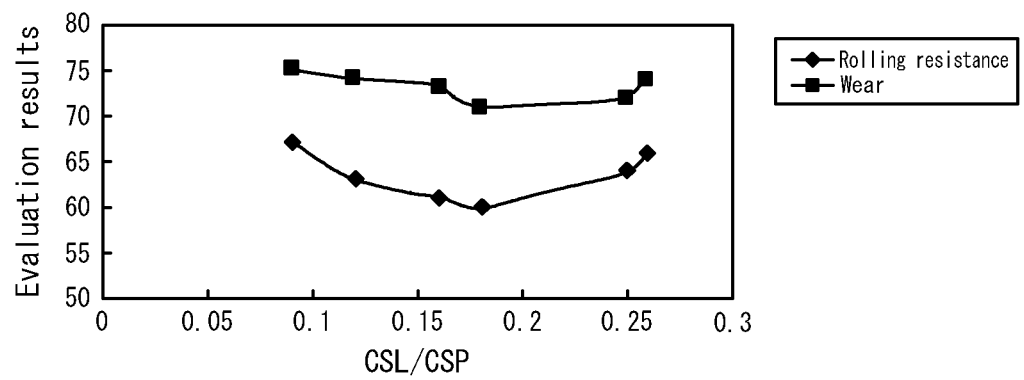
FIG. 10 is a view showing how a ratio CSL/CSP influences rolling resistance and wear resistance.

From the experiment results described above, a significant difference, as compared with the conventional tire, has been confirmed in each of rolling resistance and wear resistance when the ratio CSL/CSP is in the range of 0.1 to 0.25, as shown in FIG. 10.

Height at a position along the maximum width CSW of the carcass, distanced from one end of CSW by a length 0.8 times as long as CSW (which position may be referred to as a "position corresponding to 0.8CSW" hereinafter), is preferably in the range of 0.90 to 0.97 times and more preferably in the range of 0.92 to 0.96 times as much as the sectional height SH of the tire.
This restriction simply regulates a degree of tread curvedness at a position corresponding to 80% of the maximum width of a carcass. Bending deformation of a tread and a belt portion in a section widthwise direction thereof can be suppressed by setting the tread curvedness in the above-specified range. It should be noted that an appropriate upper limit exists in the restriction because making the tread completely flat would result in an extreme increase in the ground contact pressure at respective shoulder ends and deterioration of partial wear therein.

Hereinafter, the experiment results which revealed the aforementioned discovery will be described in details. Specifically, tests for rolling resistance and wear resistance were conducted, respectively, by using radial tires having the size 195/65 R15 under a condition in which a height at the aforementioned position corresponding to 0.8 CSW was varied at various values.
The ratio BD/BW, the ratio CSWh/CSH, the ratio SWh/SH, the ratio BW/CSW, the ratio TD/(BW/2), and the ratio CSL/CSP were maintained at 0.026, 0.746, 0.654, 0.844, 0.134 and 0.260, respectively. Other tire structuring conditions and evaluation methods are the same as those in the experiments of the ratio BD/BW.

Figure 11:
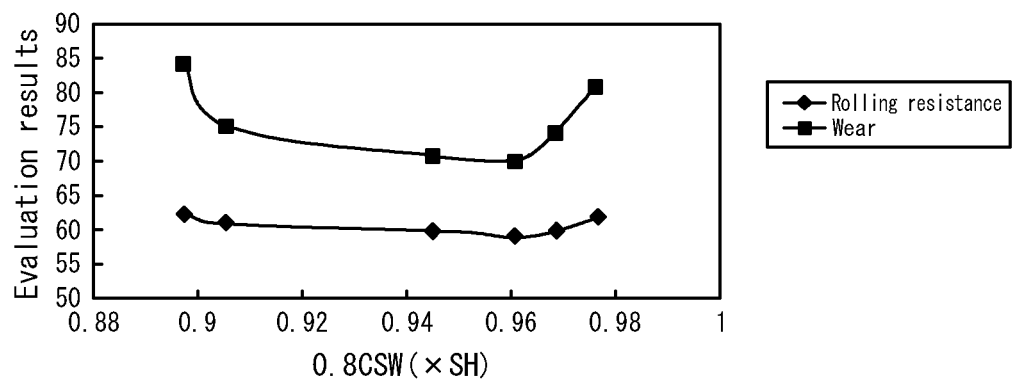
FIG. 11 is a view showing how relative height at a position corresponding to 0.8CSW influences rolling resistance and wear resistance.

From the experiment results described above, a significant difference, as compared with the conventional tire, has been confirmed in each of rolling resistance and wear resistance when height at the position corresponding to 0.8CSW is in the range of 0.92 to 0.96 times as much as the sectional height SH of the tire, as shown in FIG. 11.

A belt projection angle θ at an end portion in the widthwise direction of the outermost layer 3a of the slant belt layers is preferably in the range of 0° to 10° and more preferably in the range of 3° to 7°, as shown in FIG. 1.
This angle restriction regulates a projection angle at a belt lend portion. It is preferable to design the belt shape relatively flat as described above and it is more preferable to meticulously regulate the shape of a belt end portion. In the present invention, a belt may basically be shaped such that the belt is flat in the vicinities of the center portion and steeply curved at an end portion thereof. However, regulating a belt end portion, in particular, meticulously regulating a shape thereof has a meaning because it is known that most of shear deformation in a widthwise section occurs on the outer side in the widthwise direction of the tire. A case where a belt end portion is significantly curved to form a relatively large projection angle is especially susceptible to the shear deformation described above because the end portion of the belt is locally curved. In view of these facts, a belt projection angle is ideally as close to zero. Also in view of a relationship between a belt projection angle and a ground contact shape, a belt projection angle θ is preferably regulated to be in the range of 0° to 10°.

Hereinafter, the experiment results which revealed the aforementioned discovery will be described in details. Specifically, tests for rolling resistance and wear resistance were conducted, respectively, by using radial tires having the size 195/65 R15 under a condition in which a belt projection angle θ was varied at various values. The ratio BD/BW, the ratio CSWh/CSH, the ratio SWh/SH, the ratio BW/CSW, the ratio TD/(BW/2), the ratio CSL/CSP, and the height at the position corresponding to 0.8CSW were maintained at 0.026, 0.746, 0.654, 0.844, 0.134, 0.260, and 0.945SH, respectively. Other tire structuring conditions and evaluation methods are the same as those in the experiments of the ratio BD/BW.

Figure 12:
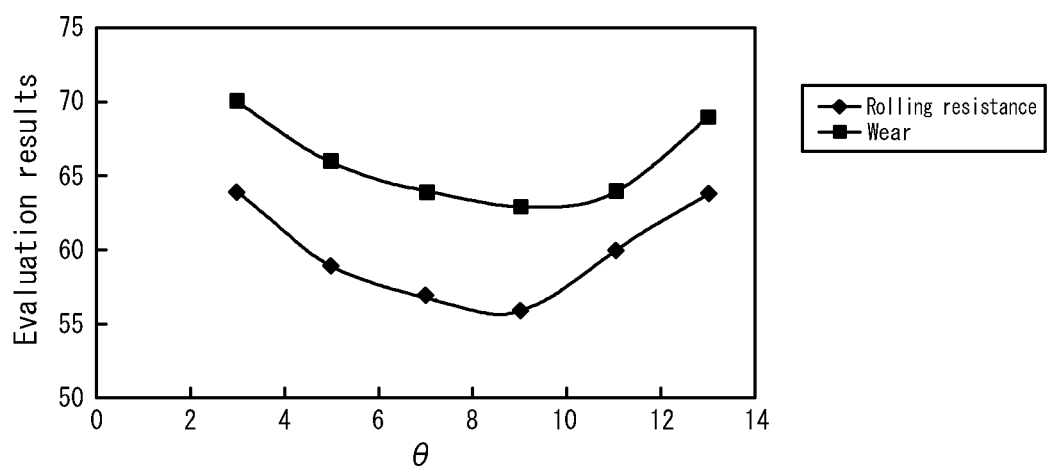
FIG. 12 is a view showing how a belt projection angle θ influences rolling resistance and wear resistance.

From the experiment results described above, a significant difference, as compared with the conventional tire, has been confirmed in each of rolling resistance and wear resistance when the belt projection angle θ is in the range of 0° to 10°, as shown in FIG. 12.

In the present embodiment, the carcass 2 has a turn-up portion 2a turned up at each bead core 1 from the inner side toward the outer side in the tire widthwise direction to extend toward the outer side in the radial direction, and the shortest distance CSEh between the terminal end of the turn-up portion 2a and a line drawn in parallel with the rotation axis of the tire at the bead toe is not larger than 0.5 times as much as the shortest distance SWh between a line drawn in parallel with the rotation axis of the tire at the maximum width position of the tire and a line drawn in parallel with the rotation axis of the tire at the bead toe, as shown in FIG. 1.
Specifically, a region where the turn-up portion 2a of the carcass 2 is disposed has relatively large bending rigidity because the region has a structure interposed by two reinforcing members, i.e. the main body of the carcass and the turn-up portion 2a. Accordingly, the farther the turn-up portion 2a extends on the outer side in the tire radial direction, the higher rigidity at the tire side portion and the larger deformation of the belt at a ground contact portion thereof are resulted, whereby rolling resistance tends to increase. However, the turn-up portion 2a does not reach a side portion region by setting the distance CSEh not larger than 0.5 times as much as the distance SWh, so that a side portion has smaller rigidity and is easy to be bent. As a result, deformation of the belt at the ground contact portion thereof is suppressed and rolling resistance is decreased.

Hereinafter, the experiment results which revealed the aforementioned discovery will be described in details. Specifically, tests for rolling resistance and wear resistance were conducted, respectively, by using radial tires having the size 195/65 R15 under a condition in which the aforementioned distance CSEh was varied at various values. The ratio BD/BW, the ratio CSWh/CSH, the ratio SWh/SH, the ratio BW/CSW, the ratio TD/(BW/2), the ratio CSL/CSP, the height at the position corresponding to 0.8CSW, and the belt projection angle θ were set at 0.022, 0.746, 0.654, 0.844, 0.074, 0.180, 0.945SH, and 2°, respectively. Other tire structuring conditions and evaluation methods are the same as those in the experiments of the ratio BD/BW.

Figure 13:
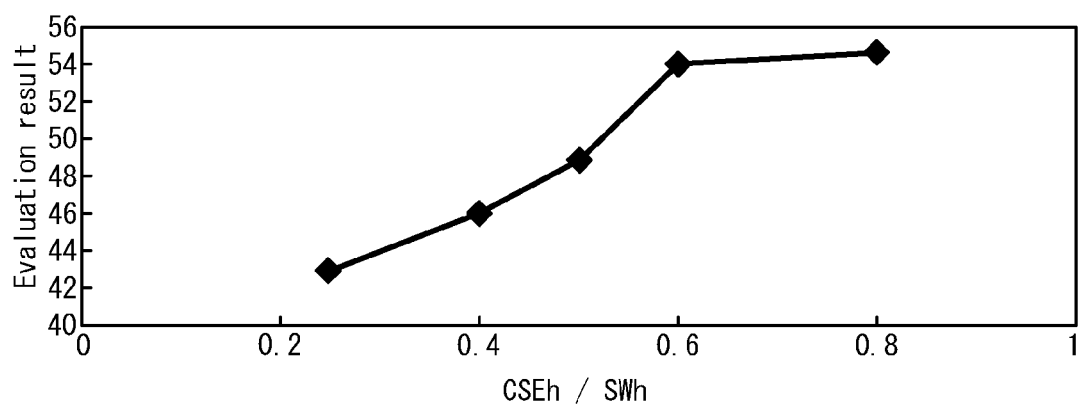
FIG. 13 is a view showing how a position of the terminal end of a carcass turn-up portion influences rolling resistance and wear resistance.

From the experiment results described above, a significant difference, as compared with the conventional tire, has been confirmed in each of rolling resistance and wear resistance when the distance CSEh is in the range not larger than 0.5 times as much as the distance SWh, as shown in FIG. 13.

Further, in addition to the restrictions described above, rubber thickness from the carcass to the tire surface at the side portion of the tire takes a smallest value thereof (i.e. reaches the rubber thickness t) preferably in a portion 20 where the carcass line has the smallest radius of curvature, as shown in FIG. 1. Reducing rubber thickness of the portion 20 results in a tire side portion which has smaller rigidity and is easy to be bent. As a result, deformation of the belt at the ground contact portion thereof is suppressed and rolling resistance is decreased.

Figure 14:
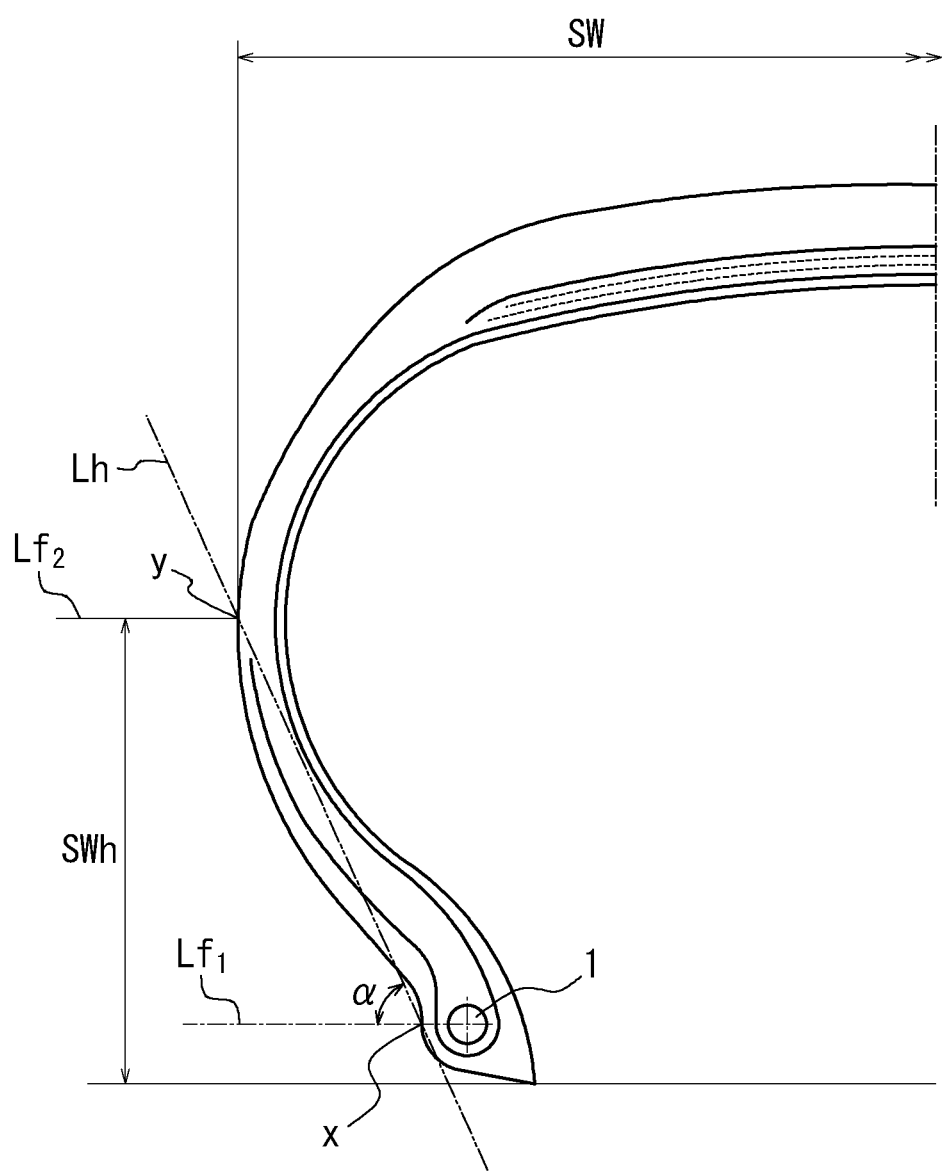
FIG. 14 is a view showing a bead rear face angle.

Yet further, provided that: the intersection of a line $Lf_1$ drawn in parallel with the rotation axis of the tire to pass through the axis center of the bead core 1, with the tire outer surface, is x; a line drawn from the intersection x to the position y at the tire outer surface corresponding to the maximum width SW of the tire is Lh; and a line drawn from the position y in parallel with the rotation axis of the tire is $Lf_2$, a bead rear face angle α formed between Lh and $Lf_2$ is to be set in the range of 68° to 75°, specifically not smaller than 70°, as shown in FIG. 14, because such a structure is effective for decreasing rigidity of a side portion of a tire, in particular, local rigidity of a bent portion thereof in the vicinity of the ground contact surface, enabling the side portion to be easily bent and deformation of the belt at the ground contact portion thereof to be suppressed.

EXAMPLES

Radial tires having the size 195/65 R15 were prepared according to the characteristics details shown in Table 1 and each subjected to the aforementioned tests for rolling resistance and wear resistance performance, respectively. These test tires share the same basic structure including one carcass ply, two slant belt layers and a circumferential reinforcing layer made of nylon disposed on the slant belt layers, in which structure cords of one slant belt layer which are inclined with respect to the tire equatorial plane by 24° intersect cords of the other slant layer which are inclined with respect to the tire equatorial plane by 24° to be symmetrical with the cords of the one slant belt layer with respect to the tire equatorial plane.

The evaluation results of the test tires are shown in Table 1. From these results, it is confirmed that the examples according to the present invention each exhibit a significant difference, as compared with the conventional examples, in rolling resistance and wear resistance performance, respectively.

TABLE 1-1

| | Dimension of tire outer surface | | | | Structural dimension | | | | | | |
|---|---|---|---|---|---|---|---|---|---|---|---|
| | SW mm | SWh mm | SH mm | TD mm | CSW mm | BW mm | CSWh mm | BD mm | θ deg. | CSH mm | L/Ltotal — |
| Comp. Example | 200 | 63 | 127 | 9 | 192 | 134 | 62 | 1 | 12 | 114 | 0.26 |
| Example 1 | 200 | 63 | 127 | 9 | 192 | 134 | 62 | 2.5 | 12 | 114 | 0.26 |
| Example 2 | 200 | 63 | 127 | 9 | 192 | 134 | 62 | 3.5 | 12 | 114 | 0.26 |
| Example 3 | 200 | 63 | 127 | 9 | 192 | 134 | 62 | 4.5 | 12 | 114 | 0.26 |
| Example 4 | 200 | 63 | 127 | 9 | 192 | 134 | 62 | 5 | 12 | 114 | 0.26 |
| Conventional Example | 200 | 63 | 127 | 9 | 192 | 134 | 62 | 7 | 12 | 114 | 0.26 |
| Example 5 | 200 | 63 | 127 | 9 | 192 | 134 | 62 | 3.5 | 12 | 114 | 0.26 |
| Example 6 | 200 | 65 | 127 | 9 | 192 | 134 | 69 | 3.5 | 12 | 114 | 0.26 |
| Example 7 | 200 | 75 | 127 | 9 | 192 | 134 | 77 | 3.5 | 12 | 114 | 0.26 |
| Example 8 | 200 | 83 | 127 | 9 | 192 | 134 | 85 | 3.5 | 12 | 114 | 0.26 |
| Example 9 | 200 | 96 | 127 | 9 | 192 | 134 | 98 | 3.5 | 12 | 114 | 0.26 |
| Example 10 | 200 | 100 | 127 | 9 | 192 | 134 | 103 | 3.5 | 12 | 114 | 0.26 |
| Example 11 | 200 | 83 | 127 | 9 | 192 | 134 | 85 | 3.5 | 12 | 114 | 0.26 |
| Example 12 | 200 | 83 | 127 | 9 | 192 | 155 | 85 | 3.5 | 12 | 114 | 0.22 |
| Example 13 | 200 | 83 | 127 | 9 | 192 | 162 | 85 | 3.5 | 12 | 114 | 0.18 |
| Example 14 | 200 | 83 | 127 | 9 | 192 | 177 | 85 | 3.5 | 12 | 114 | 0.17 |
| Example 15 | 200 | 83 | 127 | 9 | 192 | 180 | 85 | 3.5 | 12 | 114 | 0.16 |
| Example 16 | 200 | 83 | 127 | 9 | 192 | 185 | 85 | 3.5 | 12 | 114 | 0.15 |
| Example 17 | 200 | 83 | 127 | 12 | 192 | 162 | 85 | 3.5 | 12 | 114 | 0.18 |
| Example 18 | 200 | 83 | 127 | 11 | 192 | 162 | 85 | 3.5 | 12 | 114 | 0.18 |
| Example 19 | 200 | 83 | 127 | 6 | 192 | 162 | 85 | 3.5 | 12 | 114 | 0.18 |
| Example 20 | 200 | 83 | 127 | 5 | 192 | 162 | 85 | 3.5 | 12 | 114 | 0.18 |
| Example 21 | 200 | 83 | 127 | 4 | 192 | 162 | 85 | 3.5 | 12 | 114 | 0.18 |
| Example 22 | 200 | 74 | 127 | 6 | 192 | 162 | 75 | 3.5 | 12 | 114 | 0.26 |
| Example 23 | 200 | 80 | 127 | 6 | 192 | 162 | 80 | 3.5 | 12 | 114 | 0.25 |
| Example 24 | 200 | 83 | 127 | 6 | 192 | 162 | 85 | 3.5 | 12 | 114 | 0.18 |
| Example 25 | 200 | 83 | 127 | 6 | 192 | 162 | 85 | 3.5 | 12 | 114 | 0.16 |
| Example 26 | 200 | 90 | 127 | 6 | 192 | 175 | 92 | 3.5 | 12 | 114 | 0.12 |

TABLE 1-1-continued

| | Dimension of tire outer surface | | | | Structural dimension | | | | | | |
|---|---|---|---|---|---|---|---|---|---|---|---|
| | SW mm | SWh mm | SH mm | TD mm | CSW mm | BW mm | CSWh mm | BD mm | θ deg. | CSH mm | L/Ltotal — |
| Example 27 | 200 | 92 | 127 | 6 | 192 | 185 | 94 | 3.5 | 12 | 114 | 0.09 |
| Example 28 | 200 | 83 | 127 | 13 | 192 | 180 | 85 | 7 | 12 | 114 | 0.16 |
| Example 29 | 200 | 83 | 127 | 12 | 192 | 180 | 85 | 6.5 | 12 | 114 | 0.16 |
| Example 30 | 200 | 83 | 127 | 10 | 192 | 180 | 85 | 6.5 | 12 | 114 | 0.16 |
| Example 31 | 200 | 83 | 127 | 7.5 | 192 | 180 | 85 | 6 | 12 | 114 | 0.16 |
| Example 32 | 200 | 83 | 127 | 6.5 | 192 | 180 | 85 | 6 | 12 | 114 | 0.16 |
| Example 33 | 200 | 83 | 127 | 5.5 | 192 | 180 | 85 | 6 | 12 | 114 | 0.16 |
| Example 34 | 200 | 83 | 127 | 6 | 192 | 162 | 85 | 3.5 | 12 | 114 | 0.18 |
| Example 35 | 200 | 83 | 127 | 6 | 192 | 162 | 85 | 3.5 | 10 | 114 | 0.18 |
| Example 36 | 200 | 83 | 127 | 6 | 192 | 162 | 85 | 3.5 | 7 | 114 | 0.18 |
| Example 37 | 200 | 83 | 127 | 6 | 192 | 162 | 85 | 3.5 | 6 | 114 | 0.18 |
| Example 38 | 200 | 83 | 127 | 6 | 192 | 162 | 85 | 3.5 | 3 | 114 | 0.18 |
| Example 39 | 200 | 83 | 127 | 6 | 192 | 162 | 85 | 3.5 | 2 | 114 | 0.18 |
| Example 40 | 200 | 63 | 127 | 9 | 192 | 134 | 62 | 3.5 | 12 | 114 | 0.34 |
| Example 41 | 200 | 63 | 127 | 9 | 192 | 155 | 62 | 3.5 | 12 | 114 | 0.3 |
| Example 42 | 200 | 63 | 127 | 9 | 192 | 162 | 62 | 3.5 | 12 | 114 | 0.28 |
| Example 43 | 200 | 63 | 127 | 9 | 192 | 177 | 62 | 3.5 | 12 | 114 | 0.27 |
| Example 44 | 200 | 63 | 127 | 9 | 192 | 180 | 62 | 3.5 | 12 | 114 | 0.27 |
| Example 45 | 200 | 63 | 127 | 9 | 192 | 185 | 62 | 3.5 | 12 | 114 | 0.26 |
| Example 46 | 200 | 63 | 127 | 10 | 192 | 177 | 62 | 3.5 | 12 | 114 | 0.27 |
| Example 47 | 200 | 63 | 127 | 9 | 192 | 177 | 62 | 3.5 | 12 | 114 | 0.27 |
| Example 48 | 200 | 63 | 127 | 8 | 192 | 177 | 62 | 3.5 | 12 | 114 | 0.27 |
| Example 49 | 200 | 63 | 127 | 7 | 192 | 177 | 62 | 3.5 | 12 | 114 | 0.27 |
| Example 50 | 200 | 63 | 127 | 6 | 192 | 177 | 62 | 3.5 | 12 | 114 | 0.27 |
| Example 51 | 200 | 63 | 127 | 5 | 192 | 177 | 62 | 3.5 | 12 | 114 | 0.27 |
| Example 52 | 200 | 83 | 127 | 6 | 192 | 162 | 85 | 3.5 | 2 | 114 | 0.18 |
| Example 53 | 200 | 83 | 127 | 6 | 192 | 162 | 85 | 3.5 | 2 | 114 | 0.18 |
| Example 54 | 200 | 83 | 127 | 6 | 192 | 162 | 85 | 3.5 | 2 | 114 | 0.18 |
| Example 55 | 200 | 83 | 127 | 6 | 192 | 162 | 85 | 3.5 | 2 | 114 | 0.18 |

TABLE 1-2

| | Belt curved rate BD/BW | Ratio of height at the maximum width of carcass CSWh/CSH | Ratio of belt width to carcass width BW/CSW | SWh/SH | Tread Curved rate TD/(BW × 0.5) | CSL/CSP | Tread height at 0.8 × SW position (ratio to SH) | Belt projection angle θ | CESh/SWh | Rolling resistance | Wear |
|---|---|---|---|---|---|---|---|---|---|---|---|
| Comp. Example | 0.007 | 0.544 | 0.698 | 0.496 | 0.134 | 0.260 | 0.945 | 12 | 0.80 | 94 | 99 |
| Ex. 1 | 0.019 | 0.544 | 0.698 | 0.496 | 0.134 | 0.260 | 0.945 | 12 | 0.80 | 90 | 95 |
| Ex. 2 | 0.026 | 0.544 | 0.698 | 0.496 | 0.134 | 0.260 | 0.945 | 12 | 0.80 | 84 | 90 |
| Ex. 3 | 0.034 | 0.544 | 0.698 | 0.496 | 0.134 | 0.260 | 0.945 | 12 | 0.80 | 86 | 92 |
| Ex. 4 | 0.037 | 0.544 | 0.698 | 0.496 | 0.134 | 0.260 | 0.945 | 12 | 0.80 | 90 | 95 |
| Conventional Example | 0.052 | 0.544 | 0.698 | 0.496 | 0.134 | 0.260 | 0.945 | 12 | 0.80 | 100 | 100 |
| Ex. 5 | 0.026 | 0.544 | 0.698 | 0.496 | 0.134 | 0.260 | 0.945 | 12 | 0.80 | 86 | 92 |
| Ex. 6 | 0.026 | 0.605 | 0.698 | 0.512 | 0.134 | 0.260 | 0.945 | 12 | 0.80 | 82 | 86 |
| Ex. 7 | 0.026 | 0.675 | 0.698 | 0.591 | 0.134 | 0.260 | 0.945 | 12 | 0.80 | 80 | 85 |
| Ex. 8 | 0.026 | 0.746 | 0.698 | 0.654 | 0.134 | 0.260 | 0.945 | 12 | 0.80 | 78 | 84 |
| Ex. 9 | 0.026 | 0.860 | 0.698 | 0.756 | 0.134 | 0.260 | 0.945 | 12 | 0.80 | 84 | 88 |
| Ex. 10 | 0.026 | 0.904 | 0.698 | 0.787 | 0.134 | 0.260 | 0.945 | 12 | 0.80 | 87 | 92 |
| Ex. 11 | 0.026 | 0.746 | 0.698 | 0.654 | 0.134 | 0.260 | 0.945 | 12 | 0.80 | 78 | 84 |
| Ex. 12 | 0.023 | 0.746 | 0.807 | 0.654 | 0.116 | 0.220 | 0.945 | 12 | 0.80 | 76 | 80 |
| Ex. 13 | 0.022 | 0.746 | 0.844 | 0.654 | 0.111 | 0.180 | 0.945 | 12 | 0.80 | 72 | 78 |
| Ex. 14 | 0.020 | 0.746 | 0.922 | 0.654 | 0.102 | 0.170 | 0.945 | 12 | 0.80 | 73 | 77 |
| Ex. 15 | 0.019 | 0.746 | 0.938 | 0.654 | 0.100 | 0.160 | 0.945 | 12 | 0.80 | 74 | 79 |
| Ex. 16 | 0.019 | 0.746 | 0.964 | 0.654 | 0.097 | 0.150 | 0.945 | 12 | 0.80 | 79 | 85 |
| Ex. 17 | 0.022 | 0.746 | 0.844 | 0.654 | 0.148 | 0.180 | 0.945 | 12 | 0.80 | 72 | 78 |
| Ex. 18 | 0.022 | 0.746 | 0.844 | 0.654 | 0.136 | 0.180 | 0.945 | 12 | 0.80 | 66 | 74 |
| Ex. 19 | 0.022 | 0.746 | 0.844 | 0.654 | 0.074 | 0.180 | 0.945 | 12 | 0.80 | 65 | 74 |
| Ex. 20 | 0.022 | 0.746 | 0.844 | 0.654 | 0.062 | 0.180 | 0.945 | 12 | 0.80 | 67 | 76 |
| Ex. 21 | 0.022 | 0.746 | 0.844 | 0.654 | 0.049 | 0.180 | 0.945 | 12 | 0.80 | 71 | 78 |
| Ex. 22 | 0.022 | 0.658 | 0.844 | 0.583 | 0.074 | 0.260 | 0.945 | 12 | 0.80 | 66 | 74 |
| Ex. 23 | 0.022 | 0.702 | 0.844 | 0.630 | 0.074 | 0.250 | 0.945 | 12 | 0.80 | 64 | 72 |
| Ex. 24 | 0.022 | 0.746 | 0.844 | 0.654 | 0.074 | 0.180 | 0.945 | 12 | 0.80 | 60 | 71 |
| Ex. 25 | 0.022 | 0.746 | 0.844 | 0.654 | 0.074 | 0.160 | 0.945 | 12 | 0.80 | 61 | 73 |
| Ex. 26 | 0.020 | 0.807 | 0.911 | 0.709 | 0.069 | 0.120 | 0.945 | 12 | 0.80 | 63 | 74 |
| Ex. 27 | 0.019 | 0.825 | 0.964 | 0.724 | 0.065 | 0.090 | 0.945 | 12 | 0.80 | 67 | 75 |
| Ex. 28 | 0.039 | 0.746 | 0.938 | 0.654 | 0.144 | 0.160 | 0.903 | 12 | 0.80 | 62 | 84 |
| Ex. 29 | 0.036 | 0.746 | 0.938 | 0.654 | 0.133 | 0.160 | 0.915 | 12 | 0.80 | 61 | 75 |
| Ex. 30 | 0.036 | 0.746 | 0.938 | 0.654 | 0.111 | 0.160 | 0.929 | 12 | 0.80 | 60 | 71 |

TABLE 1-2-continued

|  | Belt curved rate BD/BW | Ratio of height at the maximum width of carcass CSWh/CSH | Ratio of belt width to carcass width BW/CSW | SWh/SH | Tread Curved rate TD/(BW × 0.5) | CSL/CSP | Tread height at 0.8 × SW position (ratio to SH) | Belt projection angle θ | CESh/SWh | Rolling resistance | Wear |
|---|---|---|---|---|---|---|---|---|---|---|---|
| Ex. 31 | 0.033 | 0.746 | 0.938 | 0.654 | 0.083 | 0.160 | 0.947 | 12 | 0.80 | 59 | 70 |
| Ex. 32 | 0.033 | 0.746 | 0.938 | 0.654 | 0.072 | 0.160 | 0.970 | 12 | 0.80 | 60 | 74 |
| Ex. 33 | 0.033 | 0.746 | 0.938 | 0.654 | 0.061 | 0.160 | 0.980 | 12 | 0.80 | 62 | 81 |
| Ex. 34 | 0.022 | 0.746 | 0.844 | 0.654 | 0.074 | 0.180 | 0.945 | 12 | 0.80 | 60 | 71 |
| Ex. 35 | 0.022 | 0.746 | 0.844 | 0.654 | 0.074 | 0.180 | 0.945 | 10 | 0.80 | 58 | 66 |
| Ex. 36 | 0.022 | 0.746 | 0.844 | 0.654 | 0.074 | 0.180 | 0.945 | 7 | 0.80 | 56 | 62 |
| Ex. 37 | 0.022 | 0.746 | 0.844 | 0.654 | 0.074 | 0.180 | 0.945 | 6 | 0.80 | 55.5 | 61 |
| Ex. 38 | 0.022 | 0.746 | 0.844 | 0.654 | 0.074 | 0.180 | 0.945 | 3 | 0.80 | 55 | 61 |
| Ex. 39 | 0.022 | 0.746 | 0.844 | 0.654 | 0.074 | 0.180 | 0.945 | 2 | 0.80 | 54.5 | 62 |
| Ex. 40 | 0.026 | 0.544 | 0.698 | 0.496 | 0.134 | 0.340 | 0.945 | 12 | 0.80 | 84 | 90 |
| Ex. 41 | 0.023 | 0.544 | 0.807 | 0.496 | 0.116 | 0.300 | 0.945 | 12 | 0.80 | 79 | 86 |
| Ex. 42 | 0.022 | 0.544 | 0.844 | 0.496 | 0.111 | 0.280 | 0.945 | 12 | 0.80 | 77 | 84 |
| Ex. 43 | 0.020 | 0.544 | 0.922 | 0.496 | 0.102 | 0.270 | 0.945 | 12 | 0.80 | 76 | 83 |
| Ex. 44 | 0.019 | 0.544 | 0.938 | 0.496 | 0.100 | 0.270 | 0.945 | 12 | 0.80 | 80 | 84 |
| Ex. 45 | 0.019 | 0.544 | 0.964 | 0.496 | 0.097 | 0.260 | 0.945 | 12 | 0.80 | 84 | 89 |
| Ex. 46 | 0.020 | 0.544 | 0.922 | 0.496 | 0.113 | 0.270 | 0.945 | 12 | 0.80 | 76 | 83 |
| Ex. 47 | 0.020 | 0.544 | 0.922 | 0.496 | 0.102 | 0.270 | 0.945 | 12 | 0.80 | 74 | 81 |
| Ex. 48 | 0.020 | 0.544 | 0.922 | 0.496 | 0.090 | 0.270 | 0.945 | 12 | 0.80 | 72 | 78 |
| Ex. 49 | 0.020 | 0.544 | 0.922 | 0.496 | 0.079 | 0.270 | 0.945 | 12 | 0.80 | 71 | 77 |
| Ex. 50 | 0.020 | 0.544 | 0.922 | 0.496 | 0.068 | 0.270 | 0.945 | 12 | 0.80 | 74 | 79 |
| Ex. 51 | 0.020 | 0.544 | 0.922 | 0.496 | 0.056 | 0.270 | 0.945 | 12 | 0.80 | 77 | 83 |
| Ex. 52 | 0.022 | 0.746 | 0.844 | 0.654 | 0.074 | 0.180 | 0.945 | 2 | 0.60 | 54 | 62 |
| Ex. 53 | 0.022 | 0.746 | 0.844 | 0.654 | 0.074 | 0.180 | 0.945 | 2 | 0.50 | 49 | 62 |
| Ex. 54 | 0.022 | 0.746 | 0.844 | 0.654 | 0.074 | 0.180 | 0.945 | 2 | 0.40 | 46 | 62 |
| Ex. 55 | 0.022 | 0.746 | 0.844 | 0.654 | 0.074 | 0.180 | 0.945 | 2 | 0.25 | 43 | 62 |

The invention claimed is:

1. A pneumatic tire having a carcass as a skeleton extending in a toroidal shape over a pair of bead portions, a belt including at least one slant layer, and a tread, the belt and the tread being disposed on the outer side in the tire radial direction of a crown portion of the carcass in this order, characterized in that:

a ratio BD/BW of radius difference BD between radius at the center portion and radius at an end portion in the tire widthwise direction of the outermost layer of the slant belt layer(s), to a width BW of the outermost layer, is in the range of 0.01 to 0.04 in a section of the tire in the widthwise direction in a state where the tire is assembled with an application rim, wherein a ratio CSWh/CSH of the shortest distance CSWh between a line drawn in parallel with the rotation axis of the tire the maximum width position of the carcass and a line drawn in parallel with the rotation axis of the tire at a bead toe, to a distance CSH in the radial direction between the outermost side of the carcass and the bead toe is in the range of 0.6 to 0.9.

2. The pneumatic tire of claim 1, wherein a ratio BW/CSW of the width BM of the outermost layer of the slant layer(s), to the maximum width CSW of the carcass, is in the range of 0.8 to 0.94.

3. The pneumatic tire of claim 1, wherein a ratio TD/(BW/2) of radius difference TD between radius at the center portion and radius at an end portion in the widthwise direction of the tread, to a half width BW/2 of the outermost layer of the slant belt layer(s), is in the range of 0.06 to 0.11.

4. The pneumatic tire of claim 1, wherein a ratio CSL/CSP of a path length CSL from a position corresponding to the end portion in the widthwise direction of the outermost layer of the slant belt layer(s) to a position corresponding to the maximum width of the carcass, to a path length CSP from a position corresponding to the center portion in the widthwise direction of the outermost layer of the slant layer(s) to a position right below the bead core, is in the range of 0.1 to 0.25.

5. The pneumatic tire of claim 1, wherein height at a position along the maximum width CSW of the carcass, distanced from one end of CSW by a length 0.8 times as long as CSW, is in the range of 0.90 to 0.97 times as much as the sectional height SH of the tire.

6. The pneumatic tire of claim 1, wherein a belt projection angle at an end portion in the widthwise direction of the outermost layer of the slant belt layer(s) is in the range of 0° to 10°.

7. The pneumatic tire claim 1, wherein the carcass has a turn-up portion turned up at each bead core from the inner side toward the outer side in the tire widthwise direction to extend toward the outer side in the radial direction, and the shortest distance CSWh between the terminal end of the turn-up portion and a line drawn in parallel with the rotation axis of the tire at the bead toe is not larger than 0.5 times as much as the shortest distance SWh between a line drawn in parallel with the rotation axis of the tire at the maximum width position of the tire and a line drawn in parallel with the rotation axis of the tire at the bead toe.

8. The pneumatic tire of claim 1, wherein the SWH/SH is in a range of 0.55.

9. The pneumatic tire of claim 1, wherein the CSWh/CSH is in a range of 0.65 to 0.86.

10. A pneumatic tire having a carcass as a skeleton extending in a toroidal shape over a pair of bead portions, a belt including at least one slant layer, and a tread, the belt and the tread being disposed on the outer side in the tire radial direction of a crown portion of the carcass in this order, characterized in that:

a ratio BD/BW of radius difference BD between radius at the center portion and radius at an end portion in e tire widthwise direction of the outermost layer of the slant belt layer(s), to a width BW of the outermost layer, is in the range of 0.01 to 0.04 in a section of the tire in the widthwise direction in a state where the tire is assembled with an application rim, wherein a ratio SWh/SH of the shortest distance SWh between a line drawn in parallel with the rotation axis of the tire at the maximum width position of the tire and a line drawn in parallel with the rotation axis of the tire at a bead toe, to a section height SH of the tire, is in the range of 0.5 to 0.8.

* * * * *